(12) United States Patent
Kemmerer et al.

(10) Patent No.: US 12,082,528 B2
(45) Date of Patent: Sep. 10, 2024

(54) SYSTEM AND METHOD FOR ALIGNING ARMS OF AN AGRICULTURAL HEADER

(71) Applicant: CNH Industrial America LLC, New Holland, PA (US)

(72) Inventors: Benjamin David Kemmerer, Hamburg, PA (US); Joel Timothy Cook, Akron, PA (US); Jeffrey D. Thomas, Gordonville, PA (US)

(73) Assignee: CNH Industrial America LLC, New Holland, PA (US)

( * ) Notice: Subject to any disclaimer, the term of this patent is extended or adjusted under 35 U.S.C. 154(b) by 667 days.

(21) Appl. No.: 17/292,635

(22) PCT Filed: Oct. 24, 2019

(86) PCT No.: PCT/US2019/057901
§ 371 (c)(1),
(2) Date: May 10, 2021

(87) PCT Pub. No.: WO2020/101860
PCT Pub. Date: May 22, 2020

(65) Prior Publication Data
US 2022/0000022 A1    Jan. 6, 2022

Related U.S. Application Data

(60) Provisional application No. 62/768,178, filed on Nov. 16, 2018.

(51) Int. Cl.
*A01D 41/06* (2006.01)
(52) U.S. Cl.
CPC .................... *A01D 41/06* (2013.01)

(58) Field of Classification Search
CPC ................. A01D 41/06; A01D 41/14
See application file for complete search history.

(56) References Cited

U.S. PATENT DOCUMENTS 4,573,308 A * 3/1986 Ehrecke ............ A01D 41/14
56/15.8
5,157,905 A   10/1992 Talbot et al.
(Continued)

FOREIGN PATENT DOCUMENTS

| EP | 1275287 A1 * | 1/2003 | ............ A01D 41/14 |
| WO | 2009/136275 A1 | 11/2009 | |
| WO | WO-2020101841 A1 * | 5/2020 | ............ A01D 41/14 |

OTHER PUBLICATIONS

International Search Report for PCT application PCT/US2019/057901, mailed Feb. 4, 2020 (13 pages).

*Primary Examiner* — Arpad Fabian-Kovacs
(74) *Attorney, Agent, or Firm* — Peter K. Zacharias; Rebecca L. Henkel; Rickard K. DeMille

(57) ABSTRACT

An agricultural header includes a frame and a mount having a mount opening. The agricultural header also includes an arm configured to rotate about a pivot axis relative to the frame and to support a cutter bar assembly of the agricultural header. In addition, the agricultural header includes a pin coupled to a first element and extending through the mount opening. The first element includes one of the arm and the frame. The agricultural header also includes a fastener configured to non-movably couple the mount to a second element while the fastener is in a locked state and to enable the mount to move relative to the second element while the fastener is in an unlocked state. The second element includes the other of the arm and the frame.

20 Claims, 8 Drawing Sheets

(56) References Cited

U.S. PATENT DOCUMENTS

| | | | |
|---|---|---|---|
| 5,535,578 A | 7/1996 | Honey | |
| 5,799,483 A * | 9/1998 | Voss | A01D 75/287 |
| | | | 460/119 |
| 6,076,342 A | 6/2000 | Loehr | |
| 7,866,133 B2 | 1/2011 | Funk et al. | |
| 7,913,481 B2 | 3/2011 | Sauerwein | |
| 7,930,871 B1 | 4/2011 | Figgins | |
| 11,638,395 B2 * | 5/2023 | Cook | A01D 34/28 |
| | | | 56/257 |
| 2007/0193243 A1 * | 8/2007 | Schmidt | A01D 57/20 |
| | | | 56/181 |
| 2008/0271426 A1 | 11/2008 | Lohrentz et al. | |
| 2008/0276590 A1 * | 11/2008 | Sauerwein | A01D 41/14 |
| | | | 56/153 |
| 2009/0277144 A1 * | 11/2009 | Honas | A01D 57/20 |
| | | | 56/153 |
| 2009/0277146 A1 * | 11/2009 | Sauerwein | A01D 34/13 |
| | | | 56/208 |
| 2009/0277147 A1 * | 11/2009 | Honas | A01D 41/14 |
| | | | 56/208 |
| 2009/0277148 A1 * | 11/2009 | Sethi | A01D 57/20 |
| | | | 56/208 |
| 2009/0288383 A1 * | 11/2009 | Sauerwein | A01D 57/20 |
| | | | 56/181 |
| 2009/0293441 A1 * | 12/2009 | Sauerwein | A01D 57/20 |
| | | | 56/208 |
| 2010/0043373 A1 * | 2/2010 | Lohrentz | A01D 57/20 |
| | | | 56/181 |
| 2015/0319920 A1 * | 11/2015 | Joyce | A01D 34/283 |
| | | | 81/177.1 |
| 2016/0183460 A1 * | 6/2016 | Missotten | A01D 41/145 |
| | | | 56/229 |
| 2017/0094904 A1 | 4/2017 | Sudhues et al. | |
| 2020/0375107 A1 * | 12/2020 | Duerksen | A01D 57/20 |
| 2021/0185875 A1 * | 6/2021 | Noll | A01D 41/14 |
| 2021/0185915 A1 * | 6/2021 | Hunt | A01D 34/38 |
| 2021/0212254 A1 * | 7/2021 | Thomas | A01B 73/00 |
| 2021/0392816 A1 | 12/2021 | Cook | |
| 2022/0000019 A1 | 1/2022 | Kemmerer et al. | |

* cited by examiner

SYSTEM AND METHOD FOR ALIGNING ARMS OF AN AGRICULTURAL HEADER

BACKGROUND

The present disclosure relates generally to a system and method for aligning arms of an agricultural header.

A harvester may be used to harvest agricultural crops, such as barley, beans, beets, carrots, corn, cotton, flax, oats, potatoes, rye, soybeans, wheat, or other plant crops. Furthermore, a combine (e.g., combine harvester) is a type of harvester generally used to harvest certain crops that include grain (e.g., barley, corn, flax, oats, rye, wheat, etc.). During operation of a combine, the harvesting process may begin by removing a plant from a field, such as by using a header. The header may cut the agricultural crops and transport the cut crops to a processing system of the combine.

Certain headers include a cutter bar assembly configured to cut a portion of each crop (e.g., a stalk), thereby separating the cut crop from the soil. The cutter bar assembly may extend along a substantial portion of the width of the header at a forward end of the header. In addition, the cutter bar assembly may include a cutter bar, a stationary blade assembly, and a moving blade assembly. The moving blade assembly may be fixed to the cutter bar, and the cutter bar/moving blade assembly may be driven to oscillate relative to the stationary blade assembly. Each blade assembly may include multiple blades distributed along the width of the respective blade assembly. As the moving blade assembly is driven to oscillate, the blades of the moving blade assembly move relative to the blades of the stationary blade assembly. As the header is moved through the field by the harvester, a portion of a crop (e.g., the stalk) may enter a gap between adjacent blades of the stationary blade assembly and a gap between adjacent blades of the moving blade assembly. Movement of the moving blade assembly causes a blade of the moving blade assembly to move across the gap in the stationary blade assembly, thereby cutting the portion of the crop.

Certain cutter bar assemblies are flexible along the width of the header. Such a cutter bar assembly may be supported by multiple longitudinally extending arms distributed along the width of the header. Each arm may be pivotally mounted to a frame of the header, thereby enabling the cutter bar assembly to flex during operation of the harvester. While the flexible cutter bar assembly is in contact with the soil surface, the flexible cutter bar assembly may follow the contours of the field, thereby enabling the cutting height to be substantially constant along the width of the header. If a greater cutting height is desired (e.g., based on the field conditions, the types of crops being harvested, etc.), the header may be raised such that the flexible cutter bar assembly is positioned above the soil surface. In addition, if a substantially rigid cutter bar is desired (e.g., for certain field conditions, for harvesting certain types of crops, etc.), the pivoting movement of each arm may be blocked, thereby substantially reducing the flexibility of the cutter bar assembly. Unfortunately, due to variations in the frame of the header, the cutter bar assembly may be wavy when positioned above the soil surface (e.g., while the cutter bar assembly is in the flexible configuration or the substantially rigid configuration). For example, the cutter bar assembly may be transitioned to the substantially rigid configuration by inserting a pin through an opening in each arm and a respective opening in the frame, thereby blocking pivoting movement of each arm. The arm opening and the respective frame opening may be positioned proximate to a pivot joint of the respective arm, and the cutter bar assembly may be coupled to a distal end of the respective arm. Accordingly, any variations in the frame may be magnified at the cutter bar assembly due to the length of each arm. As a result, the aesthetic appearance of the header may be reduced, and/or the cutting height may be inconsistent across the width of the header.

BRIEF DESCRIPTION

In certain embodiments, an agricultural header includes a frame and a mount having a mount opening. The agricultural header also includes an arm configured to rotate about a pivot axis relative to the frame and to support a cutter bar assembly of the agricultural header. In addition, the agricultural header includes a pin coupled to a first element and extending through the mount opening. The first element includes one of the arm and the frame. The agricultural header also includes a fastener configured to non-movably couple the mount to a second element while the fastener is in a locked state and to enable the mount to move relative to the second element while the fastener is in an unlocked state. The second element includes the other of the arm and the frame.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
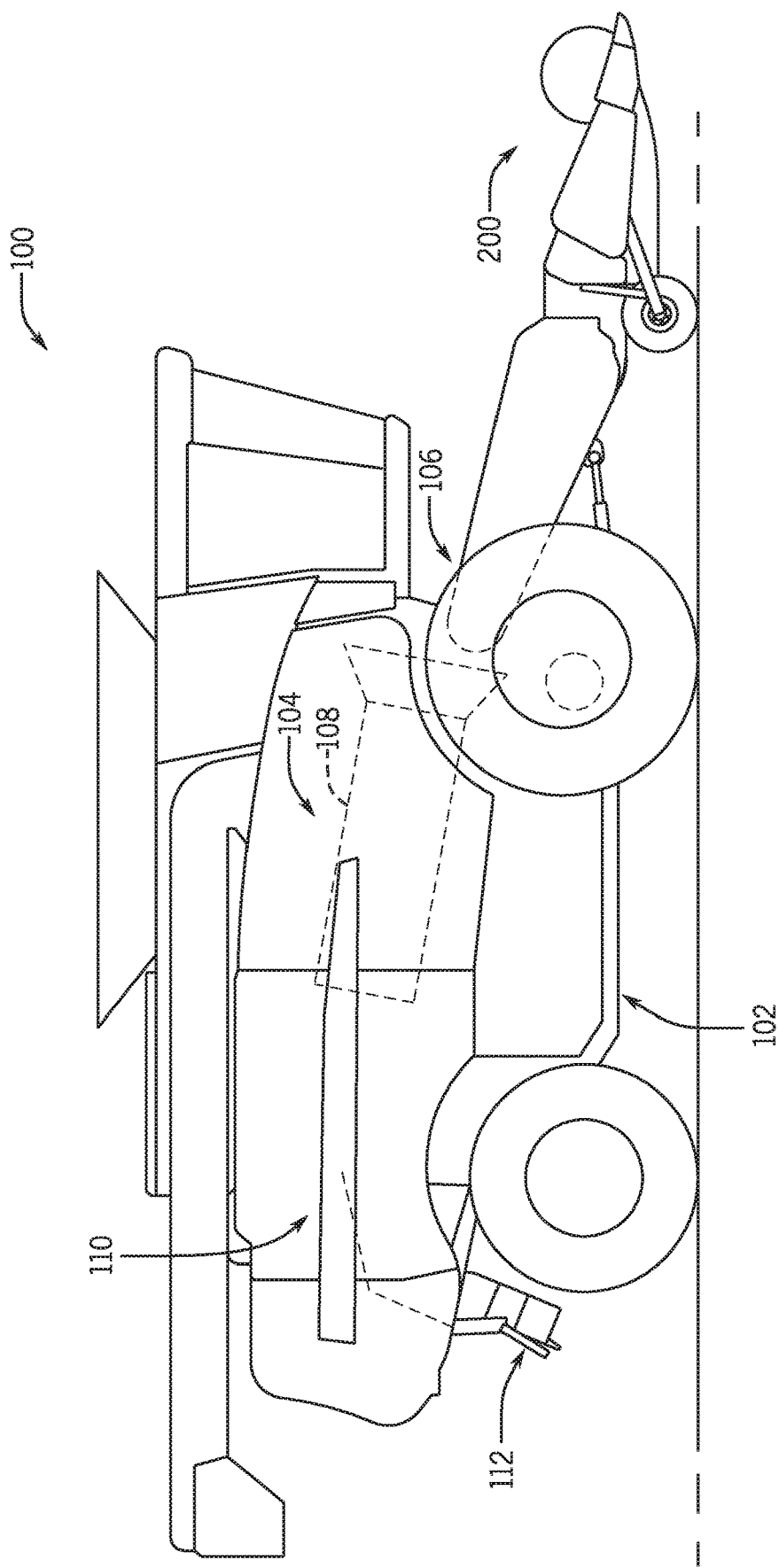
FIG. 1 is a side view of an embodiment of an agricultural harvester having a header.

Turning to the drawings, FIG. 1 is a side view of an embodiment of an agricultural harvester 100 having a header 200. The agricultural harvester 100 includes a chassis 102 configured to support the header 200 and an agricultural crop processing system 104. As described in greater detail below, the header 200 is configured to cut crops and to transport the cut crops toward an inlet 106 of the agricultural crop processing system 104 for further processing of the cut crops. The agricultural crop processing system 104 receives cut crops from the header 200 and separates desired crop material from crop residue. For example, the agricultural crop processing system 104 may include a thresher 108 having a cylindrical threshing rotor that transports the crops in a helical flow path through the harvester 100. In addition to transporting the crops, the thresher 108 may separate certain desired crop material (e.g., grain) from the crop residue, such as husks and pods, and enable the desired crop material to flow into a cleaning system located beneath the thresher 108. The cleaning system may remove debris from the desired crop material and transport the desired crop material to a storage compartment within the harvester 100. The crop residue may be transported from the thresher 108 to a crop residue handling system 110, which may remove the crop residue from the harvester 100 via a crop residue spreading system 112 positioned at the aft end of the harvester 100.

As discussed in detail below, the header 200 includes a cutter bar assembly configured to cut the crops within the field. The cutter bar assembly is configured to flex along a width of the header to enable the cutter bar assembly to substantially follow the contours of the field while the cutter bar assembly is engaged with the soil surface. The cutter bar assembly is supported by multiple longitudinally extending arms distributed along the width of the header. Each arm is pivotally mounted to a frame of the header, thereby enabling the cutter bar assembly to flex. If a substantially rigid cutter bar is desired (e.g., for certain field conditions, for harvesting certain types of crops, etc.), the pivoting movement of each arm may be blocked, thereby substantially reducing the flexibility of the cutter bar assembly.

In certain embodiments, the agricultural header includes a mount having a mount opening. In addition, the agricultural header includes an arm configured to rotate about a pivot axis relative to the frame and to support the cutter bar assembly. The agricultural header also includes a pin coupled to the arm and extending through the mount opening. Furthermore, the agricultural header includes a fastener configured to non-movably couple the mount to the frame while the fastener is in a locked state and to enable the mount to move relative to the frame while the fastener is in an unlocked state. Accordingly, an orientation of the arm relative to the frame may be controlled by moving the mount relative to the frame while the fastener is in the unlocked state. For example, while the fastener is in the unlocked state, the arm may be rotated relative to the frame of the agricultural header. As the arm rotates, the pin coupled to the arm may drive the mount to move relative to the frame. Once the arm is in a desired/target orientation, the fastener may be transitioned to the locked state to block movement of the mount relative to the frame. Interaction between the pin and the mount may hold the arm in the desired/target orientation and/or control a range of motion of the arm. The process described above may be repeated for each arm of the agricultural header, thereby establishing a desired/target shape of the cutter bar assembly along the width of the agricultural header while the cutter bar assembly is positioned above the soil surface. For example, the arms may be oriented to establish a cutter bar assembly having a substantially linear configuration or an arcuate configuration (e.g., with lateral ends of the cutter bar assembly positioned above a center of the cutter bar assembly). Establishing the desired/target shape of the cutter bar assembly may enhance the appearance of the agricultural header and/or facilitate a substantially even cutting height across the width of the agricultural header while the cutter bar assembly is positioned above the soil surface.

Figure 2:
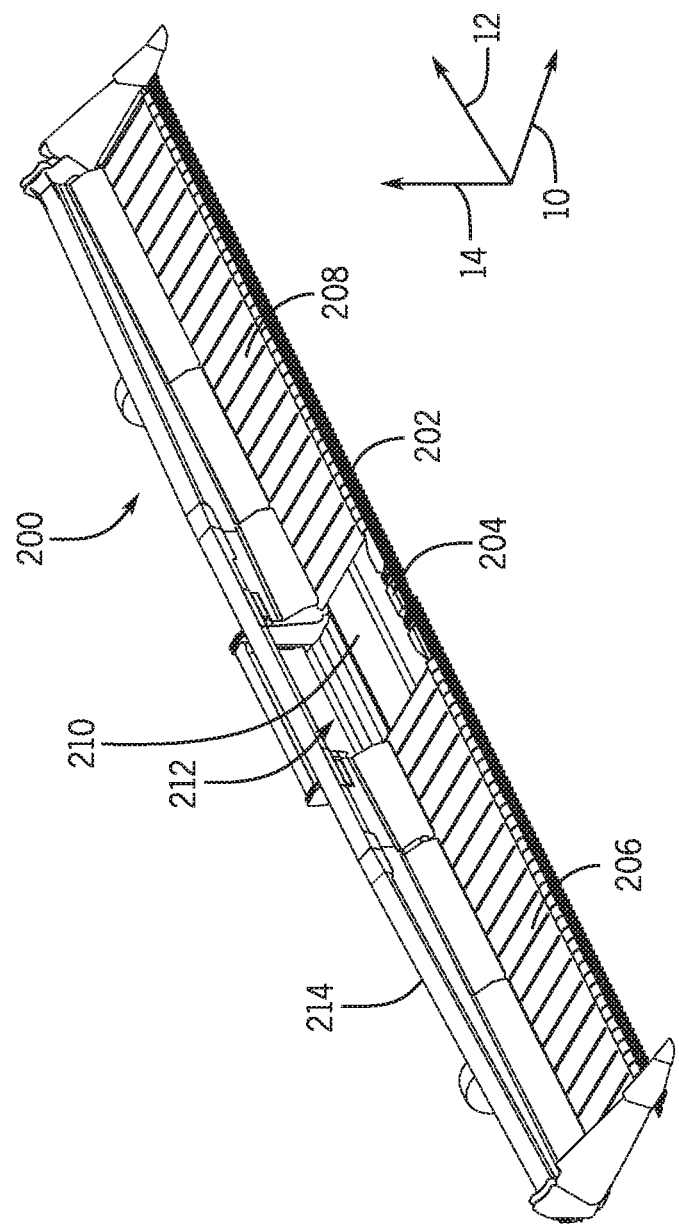
FIG. 2 is a perspective view of an embodiment of a header that may be employed within the agricultural harvester of FIG. 1.

FIG. 2 is a perspective view of an embodiment of a header 200 that may be employed within the agricultural harvester of FIG. 1. In the illustrated embodiment, the header 200 includes a cutter bar assembly 202 configured to cut a portion of each crop (e.g., a stalk), thereby separating the crop from the soil. The cutter bar assembly 202 is positioned at a forward end of the header 200 relative to a longitudinal axis 10 of the header 200. As illustrated, the cutter bar assembly 202 extends along a substantial portion of the width of the header 200 (e.g., the extent of the header 200 along a lateral axis 12). As discussed in detail below, the cutter bar assembly includes a cutter bar, a stationary blade assembly, and a moving blade assembly. The moving blade assembly is fixed to the cutter bar (e.g., above the cutter bar relative to a vertical axis 14 of the header 200), and the cutter bar/moving blade assembly is driven to oscillate relative to the stationary blade assembly. In the illustrated embodiment, the cutter bar/moving blade assembly is driven to oscillate by a driving mechanism 204 positioned at the lateral center of the header 200. However, in other embodiments, the cutter bar/moving blade assembly may be driven by another suitable mechanism (e.g., located at any suitable position on the header). As the harvester is driven through a field, the cutter bar assembly 202 engages crops within the field, and the moving blade assembly cuts the crops (e.g., the stalks of the crops) in response to engagement of the cutter bar assembly 202 with the crops.

In the illustrated embodiment, the header 200 includes a first lateral belt 206 on a first lateral side of the header 200 and a second lateral belt 208 on a second lateral side of the header 200, opposite the first lateral side. Each belt is driven to rotate by a suitable drive mechanism, such as an electric motor or a hydraulic motor. The first lateral belt 206 and the second lateral belt 208 are driven such that the top surface of each belt moves laterally inward. In addition, the header 200 includes a longitudinal belt 210 positioned between the first lateral belt 206 and the second lateral belt 208 along the lateral axis 12. The longitudinal belt 210 is driven to rotate by a suitable drive mechanism, such as an electric motor or a hydraulic motor. The longitudinal belt 210 is driven such that the top surface of the longitudinal belt 210 moves rearwardly along the longitudinal axis 10. In certain embodiments, the crops cut by the cutter bar assembly 202 are directed toward the belts by a reel assembly. Agricultural crops that contact the top surface of the lateral belts are driven laterally inwardly to the longitudinal belt due to the movement of the lateral belts. In addition, agricultural crops that contact the longitudinal belt 210 and the agricultural crops provided to the longitudinal belt by the lateral belts are driven rearwardly along the longitudinal axis 10 due to the movement of the longitudinal belt 210. Accordingly, the belts move the cut agricultural crops through an opening 212 in the header 200 to the inlet of the agricultural crop processing system.

In the illustrated embodiment, the cutter bar assembly 202 is flexible along the width of the header 200 (e.g., the extent of the header 200 along the lateral axis 12). As discussed in detail below, the cutter bar assembly 202 is supported by multiple arms extending along the longitudinal axis 10 and distributed along the width of the header 200 (e.g., along the lateral axis 12 of the header 200). Each arm is mounted to a frame 214 of the header 200 and configured to rotate about a pivot axis relative to the frame. As a result, the cutter bar assembly 202 may flex during operation of the harvester. The flexible cutter bar assembly may follow the contours of the field while the cutter bar assembly is in contact with the surface of the field, thereby enabling the cutting height (e.g., the height at which each crop is cut) to be substantially constant along the width of the header 200 (e.g., the extent of the header 200 along the lateral axis 12). However, if a substantially rigid cutter bar assembly is desired (e.g., for certain field conditions, for harvesting certain types of crops, etc.), the pivoting movement of the arms may be blocked, thereby substantially reducing the flexibility of the cutter bar assembly.

In certain embodiments, the arms of the agricultural header may be aligned with one another to establish a desired shape of the cutter bar assembly while the cutter bar assembly is positioned above the soil surface. For example, to align the arms, the cutter bar assembly may be engaged with a substantially flat surface, such as the surface of a field or a substantially flat floor (e.g., formed from concrete). Once the cutter bar assembly is engaged with the substantially flat surface, multiple fasteners may be transitioned to a locked state to non-movably couple multiple mounts to the frame of the agricultural header. Each mount has a mount opening, and a respective pin extends through each mount opening. Each pin is coupled (e.g., movably coupled) to a respective arm. Because the position of each mount relative to the frame controls the position of the respective pin relative to the frame, and because the position of the respective pin relative to the frame controls the orientation of the respective arm relative to the frame, non-movably coupling the mount to the frame via the respective fastener controls the orientation of the respective arm. Accordingly, transitioning the fasteners to the locked state while the cutter bar assembly is engaged with the substantially flat surface orients the arms at an angle that establishes a substantially linear cutter bar assembly while the cutter bar assembly is positioned above the soil surface. Accordingly, the cutting height of the cutter bar assembly may be substantially constant across the width of the header, thereby enhancing the efficiency of harvesting operations.

Figure 3:
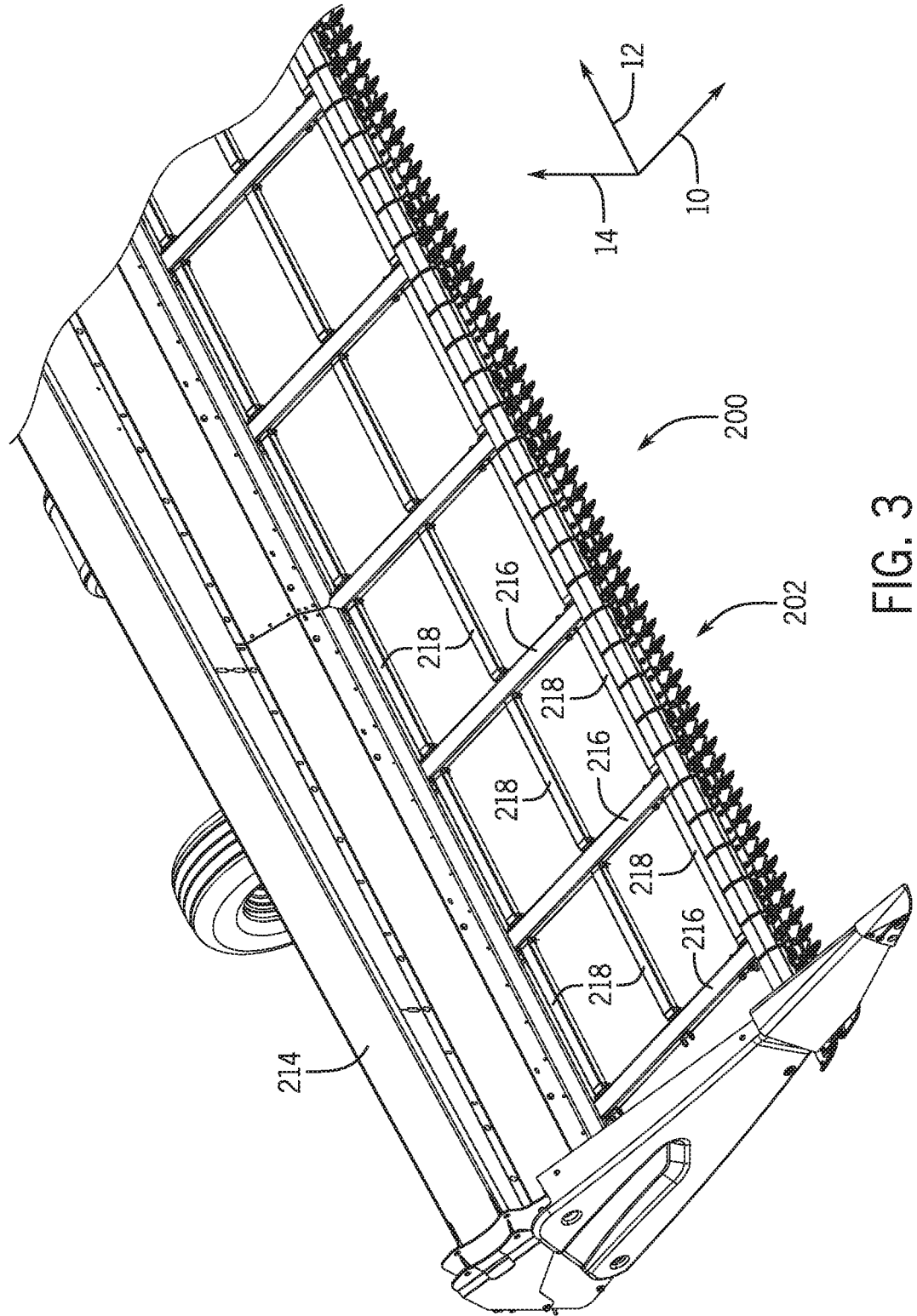
FIG. 3 is a perspective view of a portion of the header of FIG. 2, including a cutter bar assembly and arms that support the cutter bar assembly.

FIG. 3 is a perspective view of a portion of the header 200 of FIG. 2, including the cutter bar assembly 202 and arms 216 that support the cutter bar assembly 202. As illustrated, each arm 216 extends substantially along the longitudinal axis 10. However, in alternative embodiments, each arm may extend in any suitable direction. In the illustrated embodiment, the arms 216 are distributed along the width of the header 200 (e.g., the extent of the header along the lateral axis 12). The spacing between the arms may be selected to enable the arms to support the cutter bar assembly and to enable the cutter bar assembly to flex during operation of the header (e.g., while the cutter bar assembly is in the flexible configuration). As discussed in detail below, each arm 216 is pivotally coupled to the frame 214 via a respective pivot joint, and the pivot joint is configured to enable the respective arm 216 to rotate relative to the frame 214 about a respective pivot axis. In the illustrated embodiment, lateral supports 218 extend between respective pairs of arms 216. A first end of each lateral support 218 is pivotally coupled to one arm 216, and a second end of each lateral support 218 is pivotally coupled to another arm 216. The lateral supports 218 are configured to support the respective lateral belt, while enabling the arms to rotate about the respective pivot axes relative to the frame 214. While three lateral supports are positioned between each pair of arms in the illustrated embodiment, in other embodiments, more or fewer lateral supports may be positioned between at least one pair of arms (e.g., 1, 2, 3, 4, 5, 6, etc.). Furthermore, in certain embodiments, the lateral supports may be omitted between at least one pair of arms.

Figure 4:
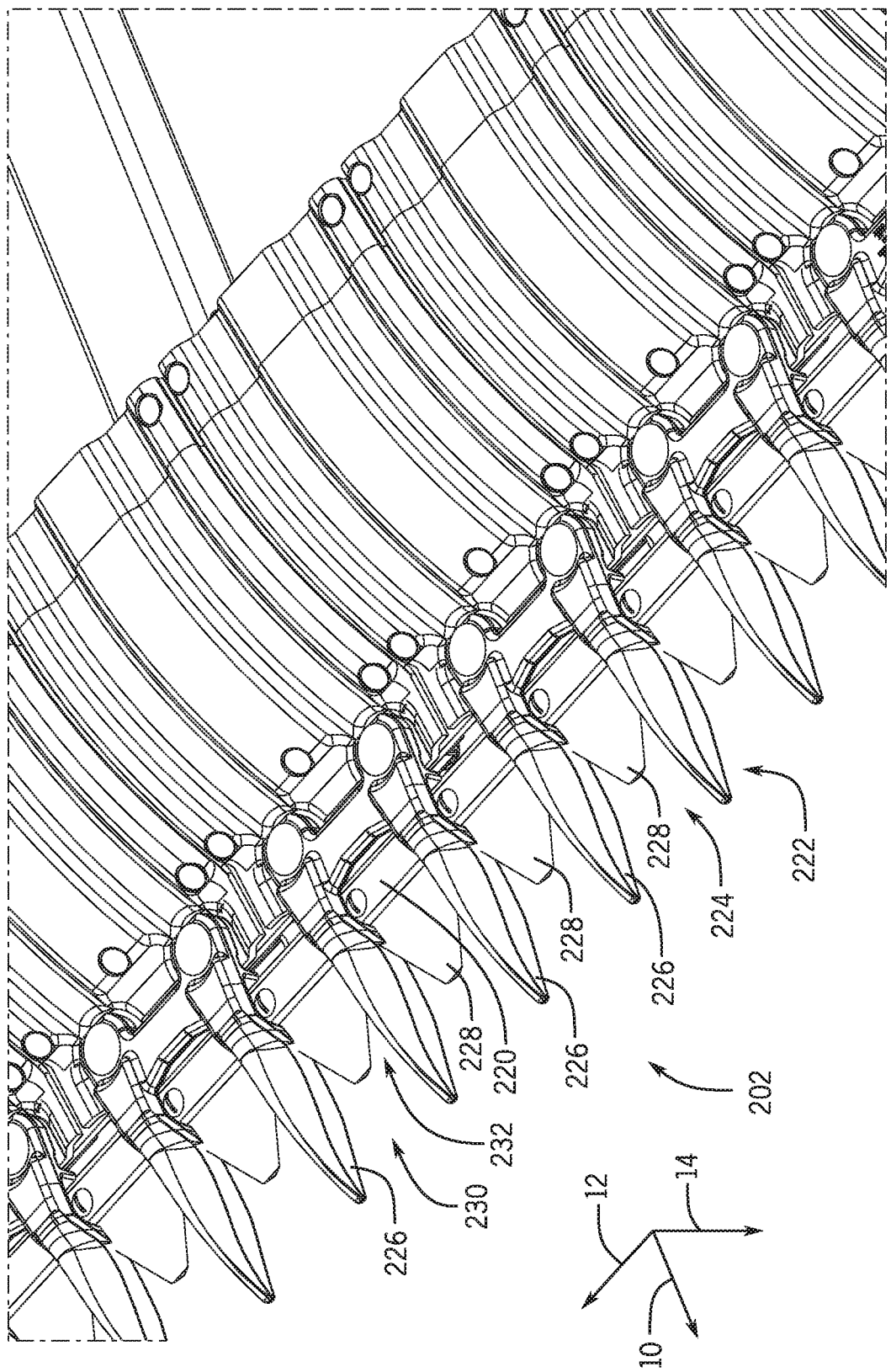
FIG. 4 is a perspective view of the cutter bar assembly of FIG. 3.

FIG. 4 is a perspective view of the cutter bar assembly 202 of FIG. 3. As illustrated, the cutter bar assembly 202 includes a cutter bar 220, a stationary blade assembly 222, and a moving blade assembly 224. The moving blade assembly 224 is coupled to the cutter bar 220, and the cutter bar 220/moving blade assembly 224 are driven to oscillate relative to the stationary blade assembly 222. The stationary blade assembly 222 includes multiple stationary blades 226 distributed along the width of the stationary blade assembly 222 (e.g., the extent of the stationary blade assembly 222 along the lateral axis 12), and the moving blade assembly 224 includes multiple moving blades 228 distributed along the width of the moving blade assembly 224 (e.g., the extent of the moving blade assembly 224 along the lateral axis 12). As the moving blade assembly 224 is driven to oscillate, the moving blades 228 move relative to the stationary blades 226. As the header is moved through the field by the harvester, a portion of a crop (e.g., the stalk) may enter a gap 230 between adjacent stationary blades 226 and a gap 232 between adjacent moving blades 228. Movement of the moving blade assembly 224 causes a moving blade 228 to move across the gap 230 in the stationary blade assembly 222, thereby cutting the portion of the crop.

In the illustrated embodiment, the stationary blade assembly 222 is coupled to the arms of the header via laterally extending support bars. For example, in certain embodiments, the support bars are coupled to the arms via fasteners, and the stationary blades of the stationary blade assembly are coupled to respective support bars by fasteners. In addition, the cutter bar 220 and the movable blade assembly 224 are movably coupled to the stationary blade assembly 222 (e.g., the cutter bar and the moving blade assembly pass through openings in the stationary blades). The support bars and the cutter bar 220 are flexible, thereby enabling the cutter bar assembly 202 to flex in response to variations in the soil surface (e.g., while the cutter bar assembly 202 is in contact with the soil surface). While the cutter bar assembly 202 is coupled to arms via support bars and fasteners in the illustrated embodiment, in other embodiments, the cutter bar assembly may be coupled to the arms via another suitable connection system (e.g., the stationary blade assembly may be welded to the arms, etc.). In addition, the cutter bar/moving blade assembly may be movably coupled to the stationary blade assembly by any suitable connection system.

Figure 5:
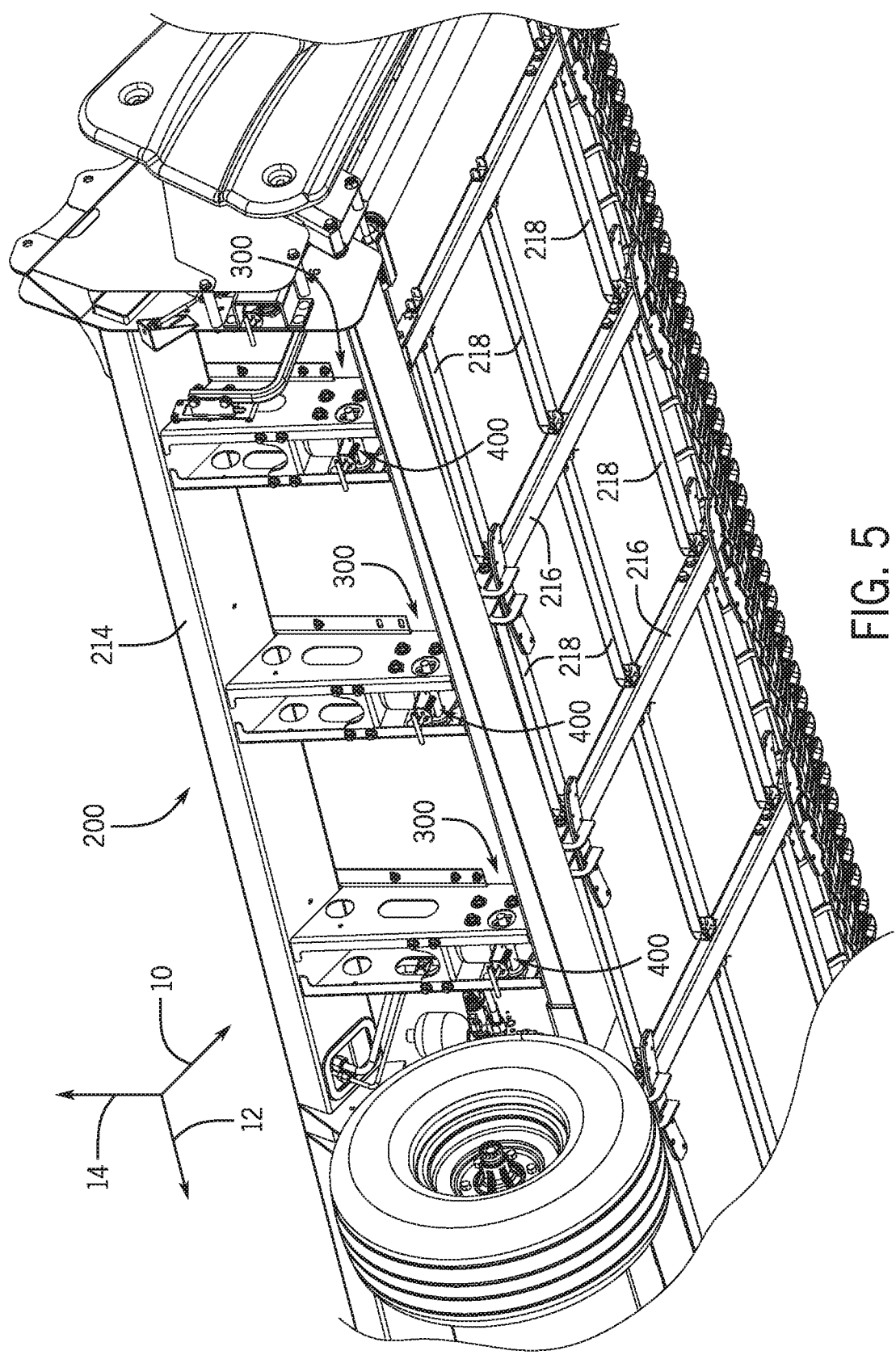
FIG. 5 is a rear perspective view of a portion of the header of FIG. 2, including arm alignment assemblies configured to facilitate alignment of the arms.

FIG. 5 is a rear perspective view of a portion of the header 200 of FIG. 2, including arm alignment assemblies 300 configured to facilitate alignment of the arms 216. In certain embodiments, each arm alignment assembly 300 includes a mount and fastener(s) extending through respective opening(s) in the frame 214. The frame opening(s) enable the fastener(s) to move relative to the frame while the fastener(s) are in an unlocked state, thereby facilitating movement of the mount relative to the frame. In response to transitioning the fastener(s) to the locked state, the mount is non-movably coupled to the frame. A pin coupled (e.g., movably coupled) to a respective arm extends through an opening in the mount. Accordingly, controlling the position of the mount relative to the frame controls the position of the pin relative to the frame, thereby controlling the orientation of the respective arm relative to the frame. As such, the mount of each arm alignment assembly may be coupled to the frame in a respective position that facilitates alignment of the arms. As used herein, "alignment" refers to an orientation of each arm that establishes a desired/target shape of the cutter bar assembly while the cutter bar assembly is positioned above the soil surface. For example, the arms may be aligned to establish a substantially linear cutter bar assembly shape (e.g., to establish a substantially even cutting height of the crops), or the arms may be aligned to establish an arcuate cutter bar assembly shape (e.g., with lateral ends of the cutter bar assembly positioned above a center of the cutter bar assembly). In the illustrated embodiment, the alignment assemblies 300 are positioned on a rear portion of the frame 214 and are accessible by an operator positioned rearward of the frame 214. However, in alternative embodiments, at least one arm alignment assembly may be positioned in another suitable position (e.g., on a forward portion of the frame, on a top portion of the frame, on a bottom portion of the frame, etc.) and may be accessible by an operator positioned at a corresponding location relative to the frame.

In the illustrated embodiment, the agricultural header includes locking mechanisms 400, in which each locking mechanism 400 is configured to selectively block rotation of a respective arm 216. Each locking mechanism 400 is configured to transition between a locked state and an unlocked state. While in the locked state, each locking mechanism is configured to block rotation of a respective arm, and while in the unlocked state, each locking mechanism is configured to facilitate rotation of the respective arm relative to the frame of the agricultural header. To establish a substantially rigid cutter bar assembly, each locking mechanism may be transitioned to a locking state (e.g., by moving a respective handle relative to the arm). The agricultural header frame may then be raised or lowered relative to the soil surface. As each arm reaches a locking orientation, each respective locking mechanism may automatically transition from the locking state to the locked state, thereby blocking rotation of the respective arm relative to the header frame. In addition, to establish a flexible cutter bar assembly, each locking mechanism may be transitioned to an unlocking state (e.g., by moving a respective handle relative to the arm). The agricultural header frame may then be raised or lowered relative to the soil surface. As each arm reaches an unlocking orientation, each respective locking mechanism may automatically transition from the unlocking state to the unlocked state, thereby facilitating rotation of the respective arm relative to the header frame. Because each locking mechanism is configured to automatically transition to the locked/unlocked state in response to the arm rotating to the locking/unlocking orientation, the process of manually rotating each arm to a position that facilitates engagement/removal of a pin with/from openings in the arm and the header frame to block/enable rotation of the arm is obviated. As a result, the cutter bar assembly may be transitioned between the flexible configuration and the substantially rigid configuration more rapidly (e.g., as compared to a process involving inserting/removing a pin through/from an opening in the arm and a corresponding opening in the frame of the agricultural header to block/enable rotation of the arm).

While the illustrated embodiment includes locking mechanisms configured to selectively enable and block rotation of the respective arms, in other embodiments, at least one of the locking mechanisms may be omitted. For example, in certain embodiments, the orientation of at least one arm may be fixed relative to the frame (e.g., upon transitioning the fastener(s) of the respective arm alignment assembly to the locked state). Furthermore, in certain embodiments, rotation of at least one arm may be enabled (e.g., by enabling movement of the pin within the opening in the mount) while the fastener(s) of the respective arm alignment assembly are in the locked state.

Figure 6:
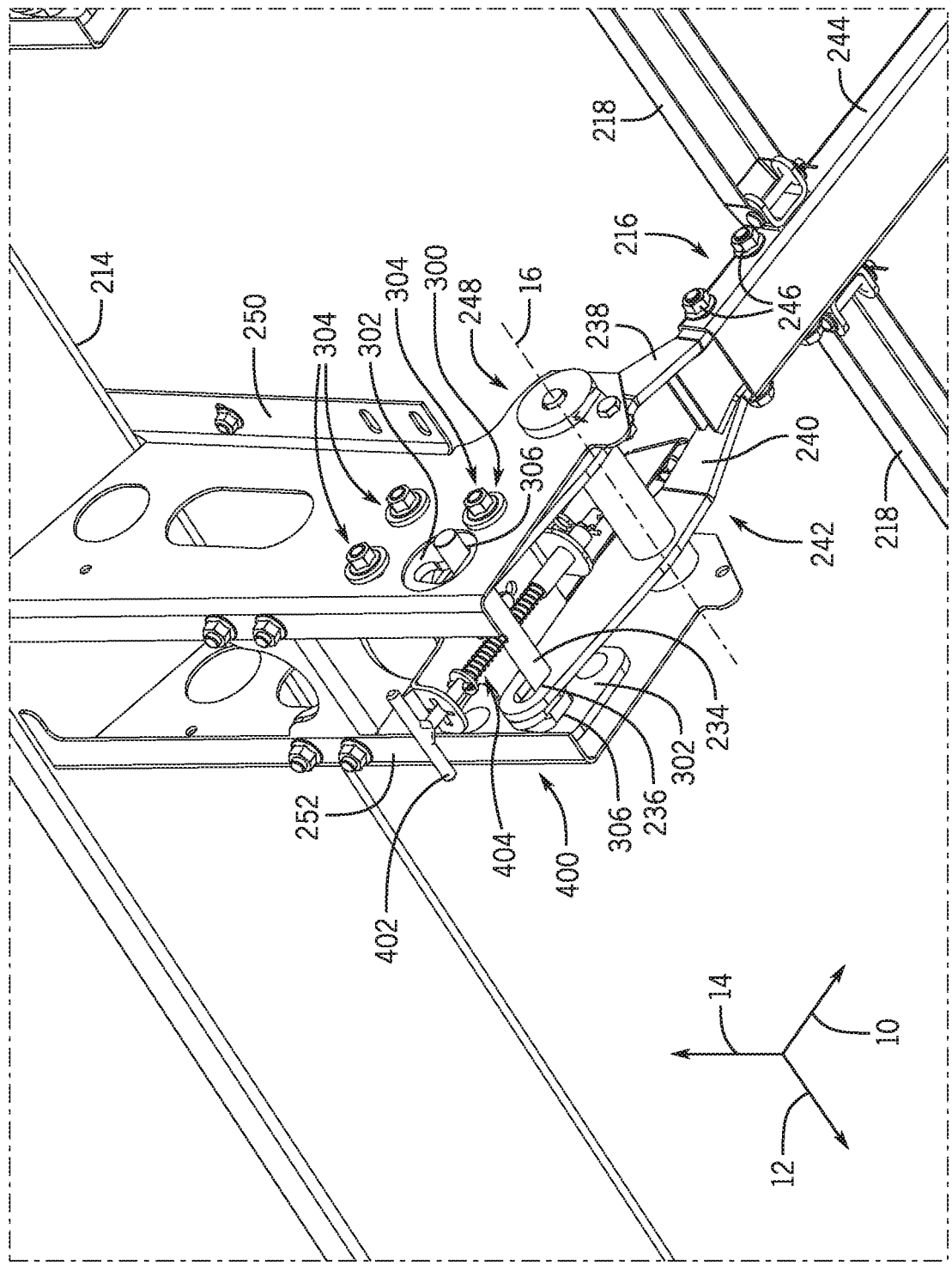
FIG. 6 is a perspective view of an arm and an arm alignment assembly of the header of FIG. 2.

FIG. 6 is a perspective view of an arm 216 and an arm alignment assembly 300 of the header of FIG. 2. As illustrated, the agricultural header includes a pin 234 movably coupled to the arm 216 (e.g., first element), such that the pin 234 is movable between a first pin position, as illustrated, and a second pin position relative to the arm 216. In the illustrated embodiment, the pin 234 is movably coupled to the arm 216 via slots 236 extending through the arm 216. The slots 236 are formed within a first member 238 and a second member 240 of a forked portion 242 of the arm 216. In the illustrated embodiment, the forked portion 242 of the arm 216 is coupled to a bar 244 of the arm 216 via fasteners 246, such as the illustrated bolts/nuts. However, in alternative embodiments, the forked portion of the arm may be coupled to the bar of the arm via other suitable fastener(s) (e.g., rivet(s), screw(s), etc.), via a welded connection, via an adhesive connection, via another suitable type of connection, or a combination thereof. Furthermore, in certain embodiments, the bar of the arm may be integral with the forked portion of the arm. In addition, while the forked portion 242 of the arm 216 includes two members in the illustrated embodiment, in other embodiments, the forked portion of the arm may include more or fewer members (e.g., 1, 2, 3, 4, 5, 6, etc.). In certain embodiments, the forked portion of the arm may be omitted, and the slot(s) may be formed within the bar of the arm. Furthermore, while the arm 216 includes two slots 236 in the illustrated embodiment, in other embodiments, the arm may have more or fewer slots to movably couple the pin to the arm.

As previously discussed, the arm 216 is configured to support the cutter bar assembly of the agricultural header. For example, a longitudinal end of the bar 244 of the arm 216, opposite the end coupled to the forked portion 242, may be coupled to the cutter bar assembly, such that the arm supports the cutter bar assembly during operation of the agricultural header. As previously discussed, the arm 216 is configured to rotate about a pivot axis 16 relative to the frame 214 of the agricultural header. As illustrated, the arm 216 is pivotally coupled to the frame 214 by a pivot joint 248. In the illustrated embodiment, the pivot joint 248 is formed at a first strut 250 and a second strut 252 of the frame 214 and at the forked portion 242 of the arm 216. However, in alternative embodiments, the pivot joint may be formed at any suitable portion of the frame and/or at any suitable portion of the arm. For example, the pivot joint may be formed at more or fewer struts of the frame. In the illustrated embodiment, the arm alignment assembly 300 and the locking mechanism 400 are positioned on an opposite side of the pivot joint 248 from the cutter bar assembly, which may be coupled to the bar 244 of the arm 216. However, in other embodiments, the arm alignment assembly and/or the locking mechanism may be positioned on the same side of the pivot joint as the cutter bar assembly.

The arm alignment assembly 300 includes mounts, such as the illustrated plates 302, coupled to the frame 214 (e.g., second element) of the agricultural header. In the illustrated embodiment, the arm alignment assembly 300 includes a first plate 302 coupled to the first strut 250 of the frame 214 and a second plate 302 coupled to the second strut 252 of the frame 214. However, in alternative embodiments, the arm alignment assembly may include more or fewer plates, each coupled to a suitable portion of the header frame. For example, in certain embodiments, the arm alignment assembly may include a single plate coupled to one of the struts, or the arm alignment assembly may include three or more plates, each coupled to a respective strut. Furthermore, in certain embodiments, at least one plate may be coupled to another suitable portion of the frame. In addition, while each mount is plate-shaped in the illustrated embodiment, in other embodiments, at least one mount may have another suitable shape (e.g., a three-dimensional shape configured to match the contours of the frame, a rectangular prismatic shape, etc.). As discussed in detail below, the arm alignment assembly 300 includes fasteners 304 configured to couple each plate 302 to the frame 214.

As illustrated, the pin 234 is disposed within an opening 306 in each plate 302. Each opening has a first portion and a second portion. The first portion is configured to receive the pin 234 while the pin 234 is in the first pin position, as illustrated, and the second portion is configured to receive the pin while the pin is in the second pin position. Furthermore, the first portion of the opening 306 is configured to block movement of the pin 234 about the pivot axis 16 to block rotation of the arm 216, and the second portion of the opening 306 is configured to enable movement of the pin 234 about the pivot axis 16 to enable rotation of the arm 216. Accordingly, with the pin 234 in the first portion of the opening 306, rotation of the arm 216 about the pivot axis 16 is blocked. As such, the locking mechanism 400 is in the locked state. In addition, with the pin 234 in the second portion of the opening 306, rotation of the arm 216 about the pivot axis 16 is enabled. As such, the locking mechanism 400 is in the unlocked state.

In the illustrated embodiment, the locking mechanism 400 includes a handle 402 and at least one biasing member 404. The handle 402 is movable between a first handle position, as illustrated, and a second handle position (e.g., along the longitudinal axis 10). The handle 402 is configured to drive the at least one biasing member 404 to urge the pin 234 toward the first pin position while the handle 402 is in the first handle position, and the handle 402 is configured to drive the at least one biasing member 404 to urge the pin 234 toward the second pin position while the handle 402 is in the second handle position. While the locking mechanism 400 includes the handle 402 in the illustrated embodiment, in other embodiments, the locking mechanism may include another suitable device configured to drive the at least one biasing member to selectively urge the pin toward the first pin position and toward the second pin position. For example, the biasing assembly may include an actuator (e.g., solenoid, hydraulic cylinder, pneumatic cylinder, etc.) configured to extend and retract to drive the at least one biasing member. By way of further example, the biasing assembly may include a screw drive (e.g., manually actuated or actuated by an actuator, such as a motor) configured to drive the at least one biasing member.

To transition the cutter bar assembly to the flexible configuration, the handle of each locking mechanism may be moved to the second handle position. While the handle is in the second handle position, the handle is configured to drive the at least one biasing member to urge the pin toward the second pin position. Accordingly, moving the handle of each locking mechanism to the second handle position transitions the locking mechanism to an unlocking state. Once each locking mechanism is in the unlocking state, the header frame may be raised or lowered relative to the soil surface (e.g., by controlling actuator(s) extending between the frame of the header and the chassis of the harvester). As each arm reaches an unlocking orientation (e.g., an orientation that enables the pin to move from the first portion of each plate opening to the second portion of the plate opening), each locking mechanism may transition from the unlocking state to the unlocked state, in which the pin is in the second portion of each plate opening. With the pin in the second portion of each plate opening, the respective arm may rotate about the pivot axis. Rotation of the arms relative to the header frame enables the cutter bar assembly to flex.

To transition the cutter bar assembly from the flexible configuration to the substantially rigid configuration, the handle of each locking mechanism may be moved to the first handle position. While the handle is in the first handle position, the handle is configured to drive the at least one biasing member to urge the pin toward the first pin position. Accordingly, moving the handle of each locking mechanism to the first handle position transitions the locking mechanism to a locking state. Once each locking mechanism is in the locking state, the header frame may be raised or lowered relative to the soil surface (e.g., by controlling actuator(s) extending between the frame of the header and the chassis of the harvester). As each arm reaches a locking orientation (e.g., an orientation that enables the pin to move from the second portion of each plate opening to the first portion of the plate opening), each locking mechanism may transition from the locking state to the locked state, in which the pin is in the first portion of each plate opening. With the pin in the first portion of each plate opening, rotation of the respective arm about the pivot axis may be blocked. Blocking rotation of each arm relative to the header frame places the cutter bar assembly in the substantially rigid configuration.

As previously discussed, the fasteners 304 of the arm alignment assembly 300 are configured to couple the plates 302 to the frame 214 of the agricultural header. In certain embodiments, a shaft of each fastener 304 extends through a respective opening in the frame 214. Each frame opening enables the respective fastener 304 to move relative to the frame 214 while the respective fastener 304 is in an unlocked state. Accordingly, while the fasteners 304 that couple a respective plate 302 to the frame 214 are in the unlocked state the respective plate 302 is movable relative to the frame 214 (e.g., within a plane formed by the vertical axis 14 and the longitudinal axis 10). In response to transitioning the fasteners 304 that couple the respective plate 302 to the frame 214 to the locked state (e.g., by tightening nuts coupled to threaded shafts of the fasteners), the respective plate 302 is non-movably coupled to the frame 214. As previously discussed, the pin 234 extends through the opening 306 in each plate 302. Accordingly, controlling the position of the plate 302 relative to the frame 214 controls the position of the pin 234 relative to the frame 214, thereby controlling the orientation of the arm 216 relative to the frame 214. As such, the plates 302 may be coupled to the frame 214 in respective positions that facilitate alignment of the arms 216.

For example, to establish a substantially linear cutter bar assembly shape (e.g., to establish a substantially even cutting height of the crops while the cutter bar assembly is positioned above the soil surface), each locking mechanism may be transitioned to the locked state, such that each pin is disposed within the first portion of the plate opening(s). Next, each fastener may be transitioned to the unlocked state such that the respective plates are movable relative to the frame of the agricultural header. The agricultural header may then be lowered (e.g., by controlling actuator(s) extending between the frame of the header and the chassis of the harvester) to engage the cutter bar assembly with a substantially flat surface, thereby establishing a substantially linear cutter bar assembly shape. The fasteners may then be transitioned to the locked state, thereby blocking movement of the plates relative to the header frame. As a result, the arms may be aligned with one another to establish a substantially linear cutter bar assembly (e.g., while the cutter bar assembly is positioned above the soil surface).

By way of further example, a substantially linear cutter bar assembly shape may also be established by transitioning each locking mechanism to the unlocked state, such that each pin is disposed within the second portion of the plate opening(s). The agricultural header may then be lowered to engage the cutter bar assembly with a substantially flat surface. As the cutter bar assembly contacts the substantially flat surface, the arms may rotate about the pivot axes, thereby driving the respective pins downwardly along the vertical axis until each pin contacts a bottom end of the second portion of the respective plate opening(s). Next, each fastener may be transitioned to the unlocked state such that the respective plates are movable relative to the frame of the agricultural header. As downward pressure on the cutter bar assembly is applied (e.g., by actuator(s) extending between the frame of the header and the chassis of the harvester), the fasteners may be transitioned to the locked state, thereby blocking movement of the plates relative to the header frame. As a result, the arms may be aligned with one another to establish a substantially linear cutter bar assembly (e.g., while the cutter bar assembly is positioned above the soil surface).

As previously discussed, each pin 234 is disposed within respective slots 236 of the arm 216 to facilitate movement of the pin 234 relative to the arm 216. In addition, the opening 306 in each plate includes a first portion configured to receive the pin 234 while the pin is in the first position relative to the arm and a second portion configured to receive the pin 234 while the pin is in the second position relative to the arm. However, in other embodiments, the pin may be fixedly coupled to the arm (e.g., the pin may be coupled to the arm, such that the pin does not move relative to the arm). In such embodiments, the opening in each respective plate may only include a single portion. For example, the opening may be slot-shaped to enable the respective arm to rotate (e.g., to establish a flexible cutter bar assembly), or the shape of the opening may substantially match the cross-sectional shape of a shaft of the pin that extends through the plate opening to block rotation of the respective arm relative to the frame (e.g., to establish a substantially rigid cutter bar assembly). In certain embodiments, the plates having single-portion openings may be interchangeable. In such embodiments, the cutter bar assembly may be transitioned between the substantially rigid configuration and the flexible configuration by coupling desired plates (e.g., plates having slot-shaped openings for a flexible configuration, or plates having fastener shaft-shaped openings for a substantially rigid configuration) to the frame of the agricultural header.

Furthermore, in certain embodiments, at least one plate may have a first opening and a second opening. The shape of the first opening may substantially match the cross-sectional shape of the shaft of the pin that extends through the first opening to block rotation of the respective arm, and the second opening may be slot-shaped to enable the respective arm to rotate. In addition, the arm may have a first opening configured to receive the pin while the pin is disposed through the first opening in the plate, and the arm may have a second opening configured to receive the pin while the pin is disposed through the second opening in the plate. Alternatively, the arm may have a slot configured to accommodate the pin while the pin is disposed through the first opening in the plate and while the pin is disposed through the second opening in the plate. The cutter bar assembly may be transitioned between the substantially rigid configuration and the flexible configuration by disposing the pin through the first plate opening or the second plate opening, respectively.

Figure 7:
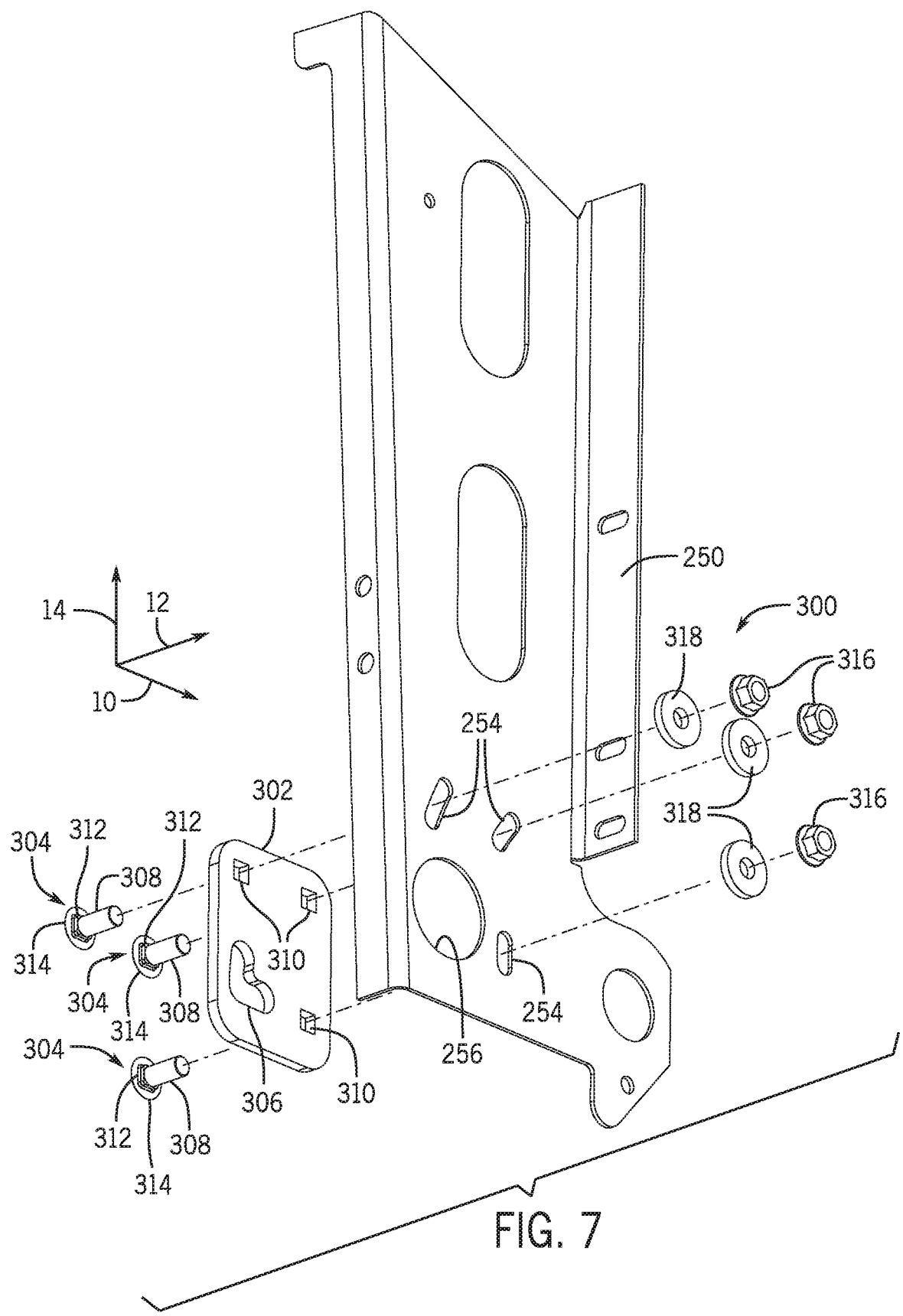
FIG. 7 is an exploded view of the arm alignment assembly of FIG. 6.

FIG. 7 is an exploded view of the arm alignment assembly 300 of FIG. 6. In the illustrated embodiment, the first strut 250 of the frame includes three frame openings 254, each configured to receive a shaft 308 of a respective fastener 304. As previously discussed, each fastener 304 is configured to non-movably couple the plate 302 to the frame (e.g., to the first strut 250 of the frame) while the fastener 304 is in the locked state. In addition, each frame opening 254 is configured to facilitate movement of the respective fastener 304 relative to the frame (e.g., relative to the first strut 250 of the frame) while the respective fastener 304 is in the unlocked state to control a position of the plate 302/plate opening 306 relative to the frame (e.g., relative to the first strut 250 of the frame). Furthermore, as previously discussed, a pin coupled to a respective arm extends through the opening 306 in the plate 302. Because the arm is configured to rotate about a respective pivot axis relative to the frame, the pin moves about the pivot axis as the arm rotates. The frame openings 254 are configured to enable the plate 302 to move along the path of the pin (e.g., in response to rotation of the respective arm) while the respective fasteners are in the unlocked state. As a result, each plate may be positioned relative to the frame to facilitate alignment of the arms.

In the illustrated embodiment, each frame opening 254 is slot-shaped (e.g., to enable the plate to move along the path of the pin, while blocking movement of the plate in a direction perpendicular to the path of the pin). Accordingly, a width of each frame opening 254 is substantially equal to a width (e.g., diameter) of the shaft 308 of the respective fastener 304. In addition, the length of each slot-shaped frame opening 254 is particularly configured to control a range of motion of the plate 302/plate opening 306, thereby controlling the rotational range of motion of the arm. However, in other embodiments, at least one frame opening may have another suitable shape to enable movement of the plate/plate opening while the fasteners are in the unlocked state and to block movement of the plate/plate opening while the fasteners are in the locked state. While the frame (e.g., the first strut 250 of the frame) has three frame openings 254 in the illustrated embodiment, in other embodiments, the frame may have more or fewer frame openings (e.g., 1, 2, 3, 4, 5, 6, or more), and a corresponding number of fasteners may extend through the frame openings. Furthermore, while the frame openings are formed in the struts in the illustrated embodiment, in other embodiments, the frame opening(s) may be formed in any other suitable portion of the frame.

In the illustrated embodiment, the plate 302 has second plate openings 310. The shaft 308 of each fastener 304 is configured to be inserted through a respective second plate opening 310, thereby enabling the fastener to couple the plate 302 to the frame. In the illustrated embodiment, each second plate opening 310 has a substantially square shape configured to engage a corresponding square engagement portion 312 of a head 314 of a respective fastener 304. Interaction between the engagement portion 312 of the head 314 of each fastener 304 and the plate 302 at the respective substantially square shaped opening 310 substantially blocks rotation of the shaft 308 relative to the plate 302. As a result, a nut 316 of each fastener 304 may be engaged with the shaft 308 (e.g., threaded shaft) without using a separate tool to block rotation of the shaft relative to the plate. In the illustrated embodiment, each fastener 304 may be transitioned between the unlocked state and the locked state by selectively rotating the nut 316 about the threaded shaft 308. For example, the nut may be rotated in a first direction about the shaft to move the nut away from the frame, thereby transitioning the fastener to the unlocked state. In addition, the nut may be rotated in a second direction, opposite the first direction, about the shaft to move the nut toward the frame, thereby compressing the plate and the frame between the head of the fastener and the nut. The fastener(s) are in the locked state when the nut(s) are rotated to position(s) in which the fastener(s) establish a sufficient contact force between the plate and the frame to block movement of the plate relative to the frame. In the illustrated embodiment, a washer 318 of each fastener 304 is disposed about the shaft 308 between the nut 316 and the frame (e.g., the first strut 250 of the frame). The washer 318 is configured to distribute the force applied by the fastener to the frame over a larger area of the frame. However, in other embodiments, the washer may be omitted (e.g., the nut may directly contact the frame).

While the engagement portion 312 of each fastener 304 and each corresponding second opening 310 of the plate 302 are substantially square in the illustrated embodiment, in other embodiments, at least one engagement portion/corresponding second opening may have another suitable shape (e.g., polygonal, elliptical, etc.) configured to block rotation of the fastener shaft relative to the plate while the engagement portion is engaged with the second plate opening. Furthermore, in certain embodiments, at least one fastener may be non-rotatably coupled to the plate (e.g., via a welded connection) to block rotation of the shaft relative to the plate. In addition, in certain embodiments, at least one fastener may be integrally formed with the plate, such that rotation of the fastener shaft is blocked relative to the plate. In certain embodiments, the engagement portion of at least one fastener may be omitted (e.g., a tool may be used to block rotation of the shaft relative to the plate while the fastener is being transitioned to the locked state). In such embodiments, the corresponding second opening in the plate may have any suitable shape (e.g., circular, etc.). While the nut is rotated about the shaft of the fastener to transition the fastener between the locked state and the unlocked state in the illustrated embodiment, in other embodiments, another suitable device may be used to transition the fastener between the locked and unlocked states. For example, in certain embodiments, a clip or a pin may be engaged with the shaft (e.g., unthreaded shaft) of the fastener to transition the fastener to the locked state, and the clip or the pin may be removed from the shaft to transition the fastener to the unlocked state.

In the illustrated embodiment, the frame (e.g., the first strut 250 of the frame) includes an aperture 256 configured to align with the plate opening 306, thereby enabling the pin to extend through the plate 302 and through the frame (e.g., the first strut 250 of the frame). The size of the aperture 256 is selected to facilitate alignment between the plate opening 306 and the aperture 256 throughout the range of motion of the plate (e.g., as determined by the shape of the frame opening(s)). Accordingly, the pin may extend through the frame regardless of the position of the pin within the frame opening and regardless of the position of the plate relative to the frame. While the aperture 256 is circular in the illustrated embodiment, in other embodiments, the aperture may have another suitable shape to facilitate passage of the pin through the frame. Furthermore, in certain embodiments, the shape of the frame may enable the pin to extend across the frame (e.g., along the lateral axis 12). For example, a notch may be formed in the frame to accommodate the pin.

While the illustrated frame opening(s) are configured to enable movement of the fastener(s) relative to the frame to facilitate movement of the plate relative to the frame, in other embodiments, the plate may include second opening(s) configured to enable movement of the plate relative to the fastener(s) extending through the second opening(s). For example, in certain embodiments, the plate may include a second opening (e.g., a slot-shaped second opening) configured to enable the plate to move relative to a respective fastener extending through the second opening. In such embodiments, the respective fastener may extend through an opening in the frame that blocks movement of the respective fastener relative to the frame, the respective fastener may be coupled to the frame (e.g., by a welded connection), or the respective fastener may be integrally formed with the frame. Alternatively, the fastener may extend through a frame opening that enables the fastener to move relative to the frame, and the fastener may extend through a second plate opening that enables the plate to move relative to the fastener. In embodiments that utilize multiple fasteners to couple the plate to the frame, the configuration of each second plate opening and the configuration of each frame opening may be particularly selected to control movement of the plate relative to the frame while the fasteners are in the unlocked state.

In certain embodiments, the pin is coupled to a first element and extends through the mount opening. In addition, the fastener is configured to non-movably couple the mount to a second element while the fastener is in the locked state and to enable the mount to move relative to the second element while the fastener is in the unlocked state. In the embodiments disclosed herein, the first element is/includes one arm, and the second element is/includes the frame. However, in other embodiments, the first element may be/include the frame, and the second element may be/include one arm. In such embodiments, the pin is coupled to the frame and extends through the mount opening. In addition, the fastener is configured to non-movably couple the mount to the arm while the fastener is in the locked state and to enable the mount to move relative to the arm while the fastener is in the unlocked state. Furthermore, in such embodiments, certain features disclosed herein with regard to the frame (e.g., the frame openings, the aperture, etc.) may be formed within the arm, and certain features disclosed herein with regard to the arm (e.g., the slots 236, etc.) may be formed within the frame.

Figure 8:
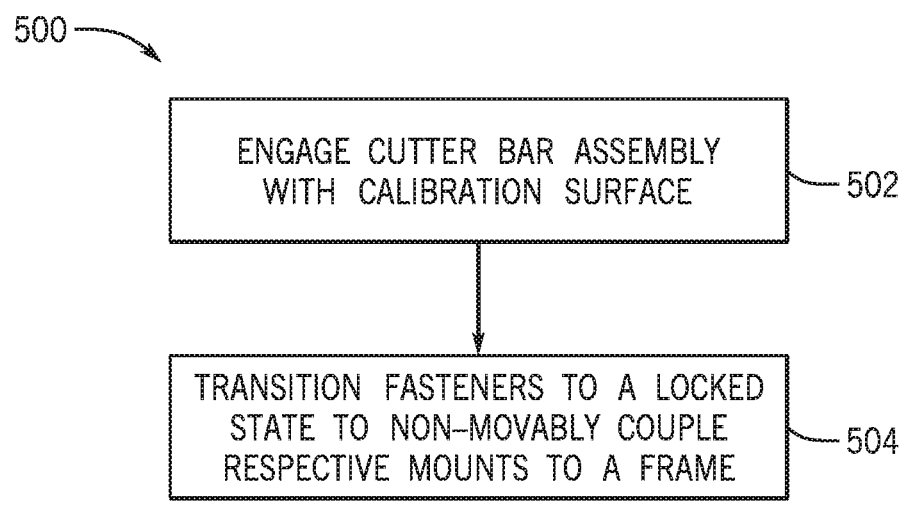
FIG. 8 is a flow chart of an embodiment of a method for aligning arms of an agricultural header.

FIG. 8 is a flow chart of an embodiment of a method 500 for aligning arms of an agricultural header. First, as represented by block 502, the cutter bar assembly is engaged with a calibration surface. For example, the manufacturing facility of the agricultural header may have a substantially flat calibration surface (e.g., concrete floor) or an arcuate calibration surface, and the cutter bar assembly of the agricultural header may be engaged with the calibration surface to facilitate alignment of the arms before the agricultural header is shipped from the manufacturing facility. By way of further example, an operator/farmer/owner of the agricultural header may engage the cutter bar assembly with a substantially flat calibration surface of a barn or garage to facilitate alignment of the arms (e.g., to compensate for deformation of the frame). In such an example, the operator/farmer/owner of the agricultural header may transition the fasteners of the arm alignment assemblies to the unlocked state before engaging the cutter bar assembly with the substantially flat calibration surface.

Next, as represented by block 504, the fasteners of the arm alignment assemblies are transitioned to the locked state to non-movably couple respective mounts (e.g., plates) of the arm alignment assemblies to the frame of the agricultural header. In certain embodiments, each fastener may be transitioned to the locked state by rotating a nut of the fastener about a threaded shaft of the fastener. With the mounts non-movably coupled to the frame of the agricultural header, the pins extending through the mount openings control the orientation of the arms (e.g., while the cutter bar assembly is positioned above the soil surface) to establish a target/desired cutter bar assembly shape. Accordingly, the appearance of the agricultural header may be enhanced and/or a substantially even cutting height across the width of the header (e.g., while the cutter bar assembly is positioned above the soil surface) may be established.

While fastener(s) are utilized to control the position of each mount (e.g., plate) relative to the frame of the agricultural header in the embodiments disclosed above, in alternative embodiments, the position of at least one mount may be controlled by another suitable assembly. For example, in certain embodiments, the position of at least one mount relative to the frame may be controlled by a screw-drive assembly, a ratchet mechanism, a hydraulic cylinder, or another suitable device. Furthermore, in certain embodiments, at least one mount and at least one corresponding pin may be omitted. In such embodiments, the orientation of each respective arm relative to the frame may be controlled by a suitable device (e.g., a screw drive, a hydraulic actuator, a ratchet assembly, etc.), thereby facilitating alignment of the arms.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An agricultural header, comprising:
a frame;
a mount having a mount opening;
an arm configured to rotate about a pivot axis relative to the frame and to support a cutter bar assembly of the agricultural header;
a pin coupled to a first element and extending through the mount opening, wherein the first element comprises one of the arm and the frame; and
a fastener configured to non-movably couple the mount to a second element while the fastener is in a locked state and to enable the mount to move relative to the second element while the fastener is in an unlocked state, wherein the second element comprises the other of the arm and the frame.

2. The agricultural header of claim 1, wherein the second element has an element opening, the fastener has a shaft extending through the element opening, and the element opening is configured to facilitate movement of the fastener relative to the second element while the fastener is in the unlocked state to control a position of the mount opening relative to the second element.

3. The agricultural header of claim 2, further comprising a second fastener, wherein the second element has a second element opening, a shaft of the second fastener extends through the second element opening, the second element opening is configured to facilitate movement of the second fastener relative to the second element while the second fastener is in an unlocked state, and the second fastener is configured to non-movably couple the mount to the second element while the second fastener is in a locked state.

4. The agricultural header of claim 2, wherein the mount has a second mount opening, and the shaft of the fastener extends through the second mount opening.

5. The agricultural header of claim 1, wherein the fastener comprises a threaded shaft and a nut, and the nut is configured to rotate about the threaded shaft to transition the fastener between the locked state and the unlocked state.

6. The agricultural header of claim 1, wherein the second element has an aperture, the aperture is aligned with the mount opening, and the pin extends through the aperture.

7. The agricultural header of claim 1, wherein the mount opening has a first portion and a second portion, the first portion is configured to receive the pin while the pin is in a first pin position relative to the first element, the second portion is configured to receive the pin while the pin is in a second pin position relative to the first element, the first portion is configured to block relative movement between the pin and the mount about the pivot axis to block rotation of the arm, and the second portion is configured to enable relative movement between the pin and the mount about the pivot axis to enable rotation of the arm.

8. An agricultural header, comprising:
a frame;
a plurality of mounts, wherein each mount of the plurality of mounts has a mount opening;
a plurality of arms configured to support a cutter bar assembly of the agricultural header, wherein each arm of the plurality of arms is configured to rotate about a pivot axis relative to the frame;
a plurality of pins, wherein each pin of the plurality of pins is coupled to a respective arm of the plurality of arms, and each pin of the plurality of pins extends through the mount opening of a respective mount of the plurality of mounts; and a plurality of fasteners, wherein each fastener of the plurality of fasteners is configured to non-movably couple a respective mount of the plurality of mounts to the frame while the fastener is in a locked state and to enable the respective mount to move relative to the frame while the fastener is in an unlocked state.

9. The agricultural header of claim 8, wherein the frame has a plurality of frame openings, each fastener of the plurality of fasteners has a shaft extending through a respective frame opening of the plurality of frame openings, and each frame opening of the plurality of frame openings is configured to facilitate movement of a respective fastener of the plurality of fasteners relative to the frame while the respective fastener is in the unlocked state to control a position of the mount opening of a respective mount of the plurality of mounts relative to the frame.

10. The agricultural header of claim 9, further comprising a second plurality of fasteners, wherein the frame has a second plurality of frame openings, a shaft of each second fastener of the second plurality of fasteners extends through a respective second frame opening of the second plurality of frame openings, each second frame opening of the second plurality of frame openings is configured to facilitate movement of a respective second fastener of the second plurality of fasteners relative to the frame while the respective second fastener is in an unlocked state, and each second fastener of the second plurality of fasteners is configured to non-movably couple a respective mount of the plurality of mounts to the frame while the second fastener is in a locked state.

11. The agricultural header of claim 9, wherein at least one mount of the plurality of mounts has a second mount opening, and the shaft of a respective fastener of the plurality of fasteners extends through the second mount opening of the at least one mount.

12. The agricultural header of claim 8, wherein at least one fastener of the plurality of fasteners comprises a threaded shaft and a nut, and the nut is configured to rotate about the threaded shaft to transition the at least one fastener between the locked state and the unlocked state.

13. The agricultural header of claim 8, wherein the frame has at least one aperture, the at least one aperture is aligned with the mount opening of a respective mount of the plurality of mounts, and a respective pin of the plurality of pins extends through the at least one aperture.

14. The agricultural header of claim 8, wherein the mount opening of at least one mount of the plurality of mounts has a first portion and a second portion, the first portion is configured to receive a respective pin of the plurality of pins while the respective pin is in a first pin position relative to a respective arm of the plurality of arms, the second portion is configured to receive the respective pin while the respective pin is in a second pin position relative to the respective arm, the first portion is configured to block movement of the respective pin about the pivot axis of the respective arm to block rotation of the respective arm, and the second portion is configured to enable movement of the respective pin about the pivot axis of the respective arm to enable rotation of the respective arm.

15. A method for aligning arms of an agricultural header, comprising:

engaging a cutter bar assembly with a calibration surface, wherein the cutter bar assembly is supported by a plurality of arms, and each arm of the plurality of arms is configured to rotate about a pivot axis relative to a frame of the agricultural header; and transitioning a plurality of fasteners to a locked state to non-movably couple a respective plurality of mounts to the frame while the cutter bar assembly is engaged with the calibration surface, wherein the plurality of fasteners are configured to enable the respective plurality of mounts to move relative to the frame while the plurality of fasteners are in an unlocked state, each mount of the respective plurality of mounts has a mount opening, each pin of a plurality of pins is coupled to a respective arm of the plurality of arms, and each pin of the plurality of pins extends through the mount opening of a respective mount of the respective plurality of mounts.

16. The method of claim 15, wherein each fastener of the plurality of fasteners has a shaft extending through a respective frame opening of a plurality of frame openings within the frame, and each frame opening of the plurality of frame openings is configured to facilitate movement of a respective fastener of the plurality of fasteners relative to the frame while the respective fastener is in the unlocked state to control a position of the mount opening of a respective mount of the respective plurality of mounts relative to the frame.

17. The method of claim 16, wherein at least one mount of the respective plurality of mounts has a second mount opening, and the shaft of a respective fastener of the plurality of fasteners extends through the second mount opening of the at least one mount.

18. The method of claim 15, wherein transitioning at least one fastener of the plurality of fasteners to the locked state comprises rotating a nut of the at least one fastener about a threaded shaft of the at least one fastener.

19. The method of claim 15, wherein the mount opening of at least one mount of the respective plurality of mounts has a first portion and a second portion, the first portion is configured to receive a respective pin of the plurality of pins while the respective pin is in a first pin position relative to a respective arm of the plurality of arms, the second portion is configured to receive the respective pin while the respective pin is in a second pin position relative to the respective arm, the first portion is configured to block movement of the respective pin about the pivot axis of the respective arm to block rotation of the respective arm, and the second portion is configured to enable movement of the respective pin about the pivot axis of the respective arm to enable rotation of the respective arm.

20. The method of claim 15, wherein the frame has at least one aperture, the at least one aperture is aligned with the mount opening of a respective mount of the respective plurality of mounts, and a respective pin of the plurality of pins extends through the at least one aperture.

* * * * *